(12) United States Patent
Natarajan et al.

(10) Patent No.: US 11,281,708 B2
(45) Date of Patent: *Mar. 22, 2022

(54) UTILIZING A MACHINE LEARNING MODEL TO PREDICT METRICS FOR AN APPLICATION DEVELOPMENT PROCESS

(71) Applicant: Capital One Services, LLC, McLean, VA (US)

(72) Inventors: Vijayalakshmi Natarajan, Glen Allen, VA (US); Omari Felix, Chesterfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,855

(22) Filed: Sep. 23, 2019

(65) Prior Publication Data

US 2020/0174774 A1    Jun. 4, 2020

Related U.S. Application Data

(63) Continuation of application No. 16/385,829, filed on Apr. 16, 2019, now Pat. No. 10,423,403.

(Continued)

(51) Int. Cl.
*G06F 8/65* (2018.01)
*G06N 20/00* (2019.01)
(Continued)

(52) U.S. Cl.
CPC ............... *G06F 16/35* (2019.01); *G06F 8/65* (2013.01); *G06F 16/215* (2019.01); *G06K 9/344* (2013.01);
(Continued)

(58) Field of Classification Search
CPC ........ G06F 8/65; G06F 8/61–65; G06F 16/35; G06F 16/215; G06F 17/27; G06F 40/20; G06N 20/00; G06K 9/344; G06K 2209/01
See application file for complete search history.

(56) References Cited

U.S. PATENT DOCUMENTS 7,506,336 B1    3/2009  Ninan
8,843,878 B1    9/2014  Grundner et al.
(Continued)

OTHER PUBLICATIONS

Lakshmisri Surya, "Improve Software Development Quality Using ML Practices", [online], [Retrieved from Interent on Nov. 6, 2021], <https://papers.ssrn.com/sol3/papers.cfm?abstract_id=3785659> (Year: 2018).*

(Continued)

*Primary Examiner* — Ziaul A Chowdhury
(74) *Attorney, Agent, or Firm* — Harrity & Harrity, LLP

(57) ABSTRACT

A device receives historical application creation data that includes data associated with creation of a plurality of applications, and processes the historical application creation data, with one or more data processing techniques, to generate processed historical application creation data. The device trains a machine learning model, with the processed historical application creation data, to generate a trained machine learning model, and receives new application data associated with a new application to be created. The device processes the new application data, with the trained machine learning model, to generate one or more predictions associated with the new application, and performs one or more actions based on the one or more predictions associated with the new application.

20 Claims, 12 Drawing Sheets

Related U.S. Application Data

(60) Provisional application No. 62/772,963, filed on Nov. 29, 2018.

(51) Int. Cl.
    *G06F 16/215*   (2019.01)
    *G06K 9/34*     (2006.01)
    *G06F 16/35*    (2019.01)
    *G06F 40/20*    (2020.01)

(52) U.S. Cl.
    CPC ............ *G06N 20/00* (2019.01); *G06F 40/20* (2020.01); *G06K 2209/01* (2013.01)

(56) References Cited

U.S. PATENT DOCUMENTS

| | | | |
|---|---|---|---|
| 9,383,984 B2 | 7/2016 | Mantripragada et al. | |
| 10,423,403 B1 | 9/2019 | Natarajan et al. | |
| 10,565,093 B1* | 2/2020 | Herrin | G06F 8/60 |
| 2005/0289503 A1* | 12/2005 | Clifford | G06F 8/20 |
| | | | 717/101 |
| 2014/0229456 A1 | 8/2014 | Hollifield et al. | |
| 2014/0327940 A1 | 11/2014 | Amtrup et al. | |
| 2015/0294246 A1 | 10/2015 | Guven et al. | |
| 2015/0338917 A1* | 11/2015 | Steiner | A61B 5/316 |
| | | | 345/156 |
| 2016/0119377 A1 | 4/2016 | Goldberg et al. | |
| 2016/0378434 A1* | 12/2016 | Martick | G06F 8/35 |
| | | | 717/101 |
| 2017/0003948 A1* | 1/2017 | Iyer | H04L 43/045 |
| 2018/0060705 A1 | 3/2018 | Abou et al. | |
| 2018/0089572 A1 | 3/2018 | Aili et al. | |
| 2018/0349114 A1 | 12/2018 | Brown et al. | |
| 2019/0004773 A1 | 1/2019 | Hoberman | |
| 2019/0005018 A1 | 1/2019 | Sharma et al. | |
| 2019/0026091 A1 | 1/2019 | Gao et al. | |
| 2020/0019493 A1* | 1/2020 | Ramakrishna | G06F 8/65 |
| 2020/0097388 A1* | 3/2020 | Bhat | G06F 17/18 |

OTHER PUBLICATIONS

Salvatore Alessandro Sarcià et al., "A Statistical Neural Network Framwork For Risk Management Process", [Online], pp. 168-177, [Retrieved from Internet on Nov. 6, 2021], <https://www.scitepress.org/papers/2007/13357/13357.pdf>, (Year: 2007).*

Witold Pedrycz et al., "Prediction of the Successful Completion of Requirements in Software Development—An Initial Study", [ Online], pp. 261-269, [Retrieved from Interent on Nov. 6, 2021], <https://d1wqtxts1xzle7.cloudfront.net/63850509/Succi.C271.AnInitialStudyonthePredictionoftheSuccessful>, (Year: 2016).*

Hu Y., et al., "Software Project Risk Management Modeling with Neural Network and Support Vector Machine Approaches", IEEE Natural Computation, Online, 2007, pp. 1-5, Retrieved from Internet on Jun. 27, 2019, Retrieved from ">https://ieeexplore.ieee.org/starnp/starnp.jsp?tp=&arnumber=4344537.

Patel K., et al., "Investigating Statistical Machine Learning as a Tool for Software Development", CHI 2008 Proceedings, Online, Apr. 2008, pp. 667-676, Retrieved from Internet on Jun. 27, 2019, Retrieved from ">http://delivery.acm.org/10.1145/1360000/1357160/p667-patel.pdf.

Procaccino J.D., et al., "Case Study: Factors for Early Prediction of Software Development Success", Information and Software Technology, Online, Jan. 2002, vol. 44 (1), 26 pages, Retrieved from Internet on Jun. 27, 2019, Retrieved from "title=" Link: https://www.sciencedirect.corn/science/article/pii/S0950584901002178>">https://www.sciencedirect.com/science/article/pii/S0950584901002178.

* cited by examiner

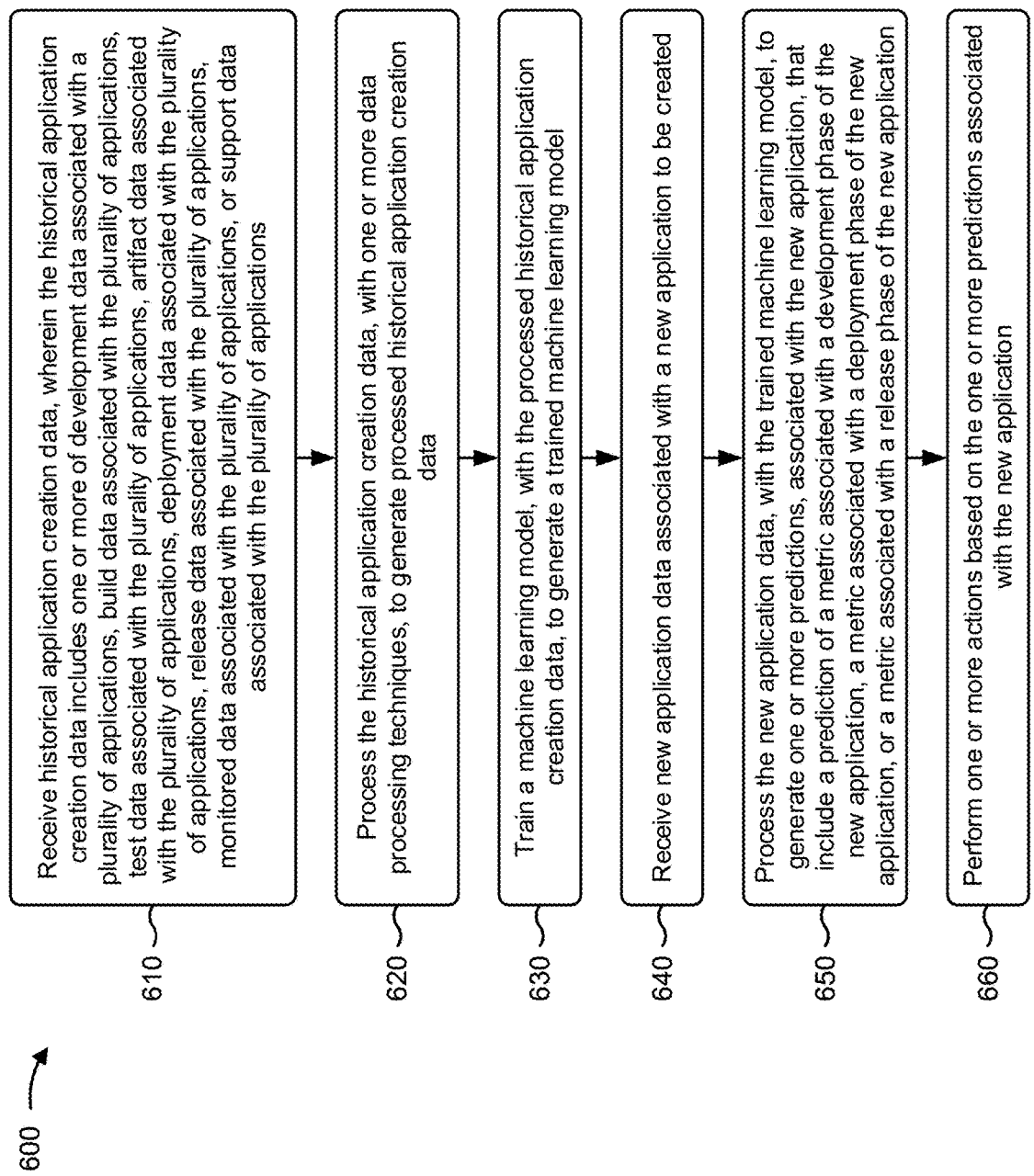

UTILIZING A MACHINE LEARNING MODEL TO PREDICT METRICS FOR AN APPLICATION DEVELOPMENT PROCESS

RELATED APPLICATIONS

This application is a continuation of U.S. patent application Ser. No. 16/385,829, filed Apr. 16, 2019 (now U.S. Pat. No. 10,423,403), which claims priority under 35 U.S.C. § 119 to U.S. Provisional Patent Application No. 62/772,963, filed on Nov. 29, 2018, the content of which are incorporated by reference herein in their entirety.

BACKGROUND

In software engineering, a software application development process (e.g., also known as a software development life cycle) is the process of dividing software development work into distinct phases to improve design, product management, project management, and/or the like. The software application development process may include an application development phase, an application build phase, an application testing phase, an application artifact phase, an application deployment phase, an application release phase, an application monitoring phase, an application support phase, and/or the like.

SUMMARY

According to some implementations, a method may include receiving historical application creation data, wherein the historical application creation data may include data associated with creation of a plurality of applications, and processing the historical application creation data, with one or more data processing techniques, to generate processed historical application creation data. The method may include training a machine learning model, with the processed historical application creation data, to generate a trained machine learning model, and receiving new application data associated with a new application to be created. The method may include processing the new application data, with the trained machine learning model, to generate one or more predictions associated with the new application, wherein the one or more predictions include one or more of a prediction indicating whether the new application will succeed or fail during development of the new application, a prediction indicating whether the new application will succeed or fail during deployment of the new application, or a prediction indicating whether the new application will succeed or fail during release of the new application. The method may include performing one or more actions based on the one or more predictions associated with the new application.

According to some implementations, a device may include one or more memories, and one or more processors, communicatively coupled to the one or more memories, configured to receive historical application creation data, wherein the historical application creation data may include data associated with creation of a plurality of applications. The one or more processors may process the historical application creation data, with one or more data processing techniques, to generate processed historical application creation data, and may train a machine learning model, with the processed historical application creation data, to generate a trained machine learning model. The one or more processors may receive new application data associated with a new application to be created, and may process the new application data, with the trained machine learning model, to generate one or more predictions associated with the new application. The one or more processors may calculate, based on the one or more predictions, a risk score associated with at least one of developing the new application, deploying the new application, or releasing the new application, and may determine that the new application is to be developed, deployed, or released based on the risk score associated with the at least one of developing the new application, deploying the new application, or releasing the new application.

According to some implementations, a non-transitory computer-readable medium may store instructions that include one or more instructions that, when executed by one or more processors of a device, cause the one or more processors to receive historical application creation data, wherein the historical application creation data may include one or more of development data associated with a plurality of applications, build data associated with the plurality of applications, test data associated with the plurality of applications, artifact data associated with the plurality of applications, deployment data associated with the plurality of applications, release data associated with the plurality of applications, monitored data associated with the plurality of applications, or support data associated with the plurality of applications. The one or more instructions may cause the one or more processors to process the historical application creation data, with one or more data processing techniques, to generate processed historical application creation data, and train a machine learning model, with the processed historical application creation data, to generate a trained machine learning model. The one or more instructions may cause the one or more processors to receive new application data associated with a new application to be created, and process the new application data, with the trained machine learning model, to generate one or more predictions associated with the new application, wherein the one or more predictions include one or more of a prediction of a metric associated with a development phase of the new application, a prediction of a metric associated with a deployment phase of the new application, or a prediction of a metric associated with a release phase of the new application. The one or more instructions may cause the one or more processors to perform one or more actions based on the one or more predictions associated with the new application.

BRIEF DESCRIPTION OF THE DRAWINGS

FIGS. 4-6 are flow charts of example processes for utilizing a machine learning model to predict metrics for an application development process.

DETAILED DESCRIPTION

The following detailed description of example implementations refers to the accompanying drawings. The same reference numbers in different drawings may identify the same or similar elements.

Software application development relies on multiple techniques to generate reliable and stable applications. However, it is difficult to measure quality and consistency of the application development process due to tracking multiple variables (e.g., tools utilized to create an application, time spent creating an application, project structure for creating an application, and/or the like). This wastes time and resources (e.g., processing resources, memory resources, human resources, and/or the like) due to generation of unreliable software applications, generation of unmaintainable code bases, reworking and/or rewriting defective software applications, and/or the like.

Some implementations described herein provide a metric platform that utilizes a machine learning model to predict metrics for an application development process. For example, the metric platform may receive historical application creation data that includes data associated with creation of a plurality of applications, and may process the historical application creation data, with one or more data processing techniques, to generate processed historical application creation data. The metric platform may train a machine learning model, with the processed historical application creation data, to generate a trained machine learning model, and may receive new application data associated with a new application to be created. The metric platform may process the new application data, with the trained machine learning model, to generate one or more predictions associated with the new application, and may perform one or more actions based on the one or more predictions associated with the new application.

In this way, the metric platform prevents wasted time and resources, generation of unreliable software applications, generation of unmaintainable code bases, reworking and/or rewriting defective software applications, and/or the like. The metric platform provides insights, at all phases of the application development process, that ensure that a reliable application is generated. Furthermore, the metric platform reduces a need for human resources, and conserves resources (e.g., processing resources, memory resources, monetary resources, and/or the like) that would otherwise be wasted in generating unreliable applications, repairing and/or recoding unreliable applications, and/or the like.

Figure 1A:
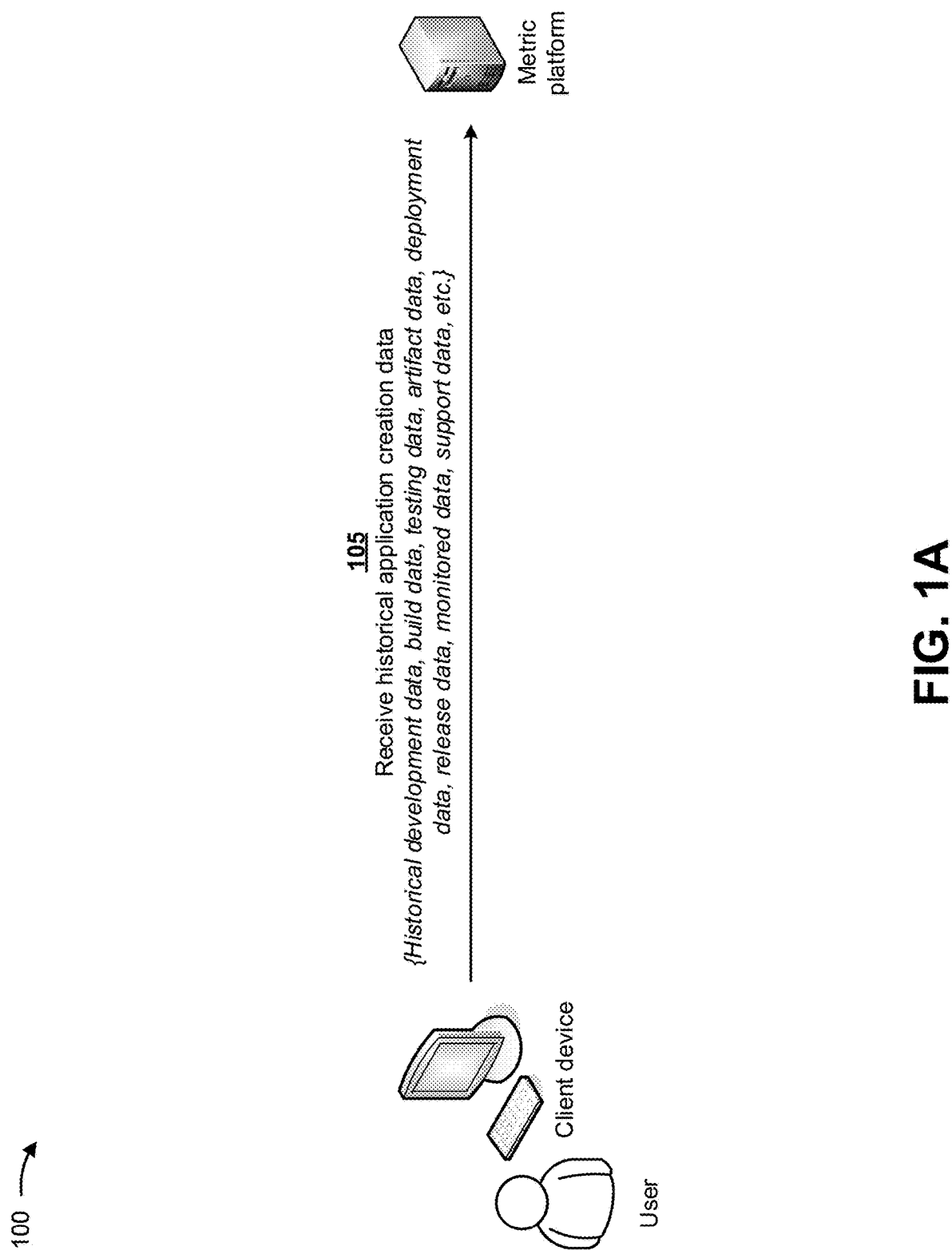
FIGS. 1A-1G are diagrams of one or more example implementations described herein.

FIGS. 1A-1G are diagrams of one or more example implementations 100 described herein. As shown in FIG. 1A, a client device may be associated with a metric platform and a user. The user may cause the client device to provide (e.g., from the client device and/or from other devices) historical application creation data to the metric platform. As further shown, and by reference number 105, the metric platform may receive the historical application creation data from the client device.

In some implementations, the metric platform may be associated with hundreds, thousands, millions, and/or the like of client devices and users and may receive the historical application creation data from the client devices and/or other devices (e.g., server devices). The historical application creation data may include historical data associated with previously developed applications, such as historical development data, historical build data, historical testing data, historical artifact data, historical deployment data, historical test management data, historical release data, historical monitored data, historical support data, and/or the like. In some implementations, the historical application creation data may include data associated with applications that are currently being developed (e.g., at different phases of the application development process). In some implementations, the historical application creation data may be received in real time from the client device(s) and/or the other devices, may be periodically received from the client device(s) and/or the other devices, may be received based on a request (e.g., on demand) generated by the metric platform, and/or the like.

The historical development data may include data describing tracking updates and/or defects, data providing structure reliability for development, data describing review sessions of previously developed applications conducted by a developer and other parties, data describing static analysis performed on previously developed applications, data describing issue tracking associated with previously developed applications, and/or the like.

The historical build data may include data describing builds associated with previously developed applications, reporting associated with previously developed applications, documentation from previously developed applications, standardized libraries associated with previously developed applications, packaging procedures associated with previously developed applications, and/or the like.

The historical testing data may include data describing unit tests (e.g., tests designed to target individual units of source code or modules to determine functionality) associated with previously developed applications, code coverage tests (e.g., tests of an amount of source code accessed by the tests) associated with previously developed applications, service visualization tests (e.g., tests of application interaction) associated with previously developed applications, and/or the like.

The historical artifact data may include data describing the publishing of artifacts, associated with previously developed applications, from a build phase to a repository that is version controlled.

The historical deployment data may include data describing configuration management data (e.g., bringing applications online and making additional configuration changes) associated with previously developed applications, provisioning data (e.g., the creation and association of application resources) associated with previously developed applications, container data (e.g., lightweight packaging for efficient distribution of applications) associated with previously developed applications, cloud data associated with previously developed applications, and/or the like.

The historical test management data may include data describing acceptance (e.g., a set of tests to test an execution state of an application) associated with previously developed applications, performance (e.g., a set of tests that gauge how an application will perform under a certain workload) associated with previously developed applications, security (e.g., tests indicating potential application vulnerabilities) associated with previously developed applications, durability (e.g., tests indicating application recovery mechanisms) associated with previously developed applications, and/or the like.

The historical release data may include data describing continuous management (e.g., repeated checking and creating new versions of code) associated with previously developed applications, approval management (e.g., interaction with a release engineering tool) associated with previously developed applications, release status (e.g., an indication of whether a release was successful, rolled back, partially successful, and/or the like) associated with previously developed applications, and/or the like.

The historical monitored data may include data describing application performance (e.g., efficiency of application processing activities) associated with previously developed applications, infrastructure performance (e.g., efficiency of resource interactions by applications) associated with previously developed applications, business intelligence (e.g., current data operations extracting indicators for predictive actions) associated with previously developed applications, and/or the like.

The historical support data may include data describing notifications (e.g., alerting for actions or certain system states) associated with previously developed applications, a support system (e.g., routine maintenance or error remediation) associated with previously developed applications, release statistics (e.g., release results) associated with previously developed applications, incident statistics (e.g., production incidents) associated with previously developed applications, and/or the like.

In some implementations, the metric platform may receive the historical application creation data from multiple different sources (e.g., client devices, server devices, logs, databases, documents, etc.) in multiple different formats. The metric platform may process unstructured data (e.g., some or all of the historical application creation data may fall into this category of data), may process structured data (e.g., some or all of the historical application creation data might fall into this category of data), may process a very large volume of data points (billions, trillions, or more data points) some of which might be structured and some of which might be unstructured in the historical application creation data, and/or the like.

Figure 1B:
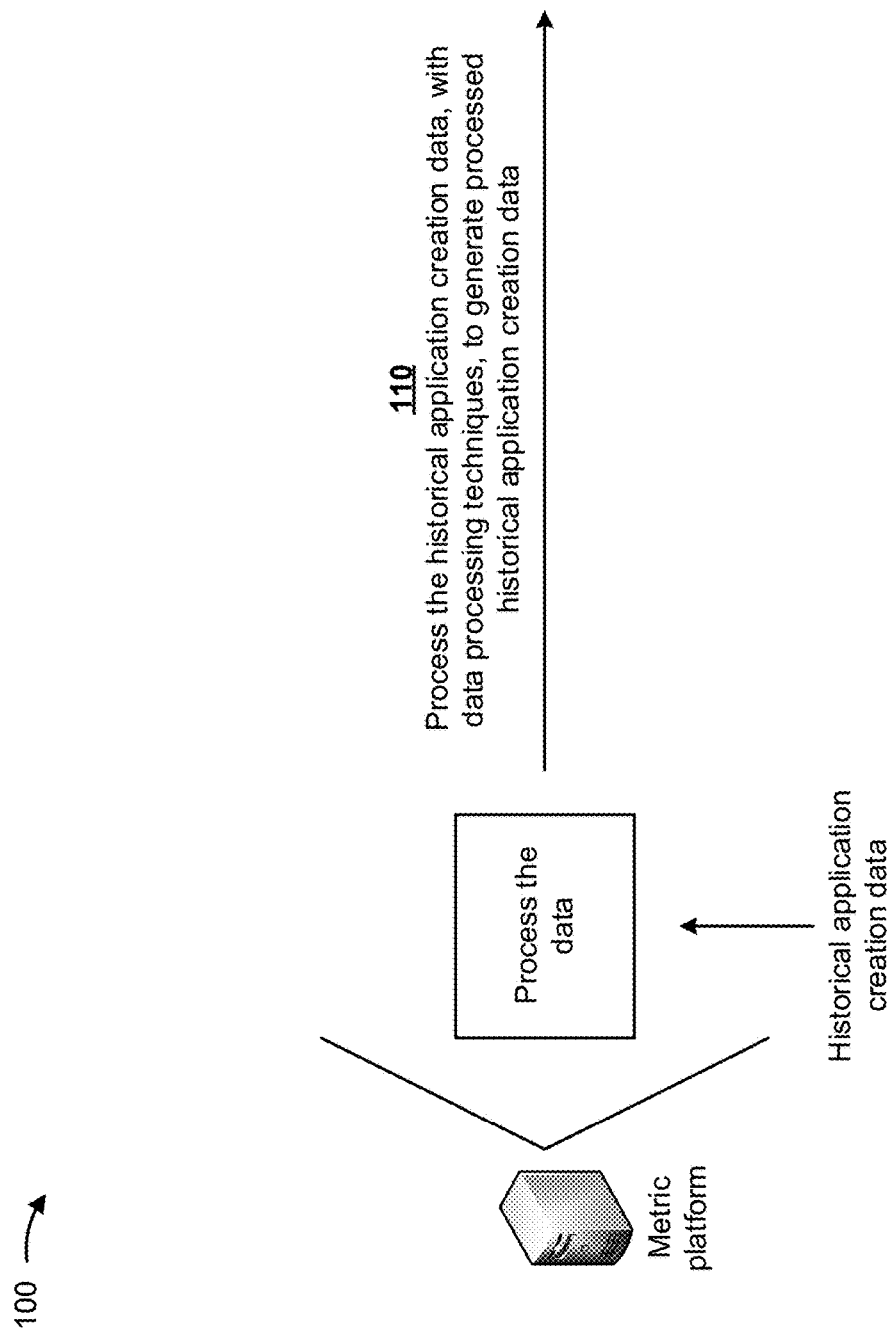

As shown in FIG. 1B, and by reference number 110, the metric platform may process the historical application creation data, with data processing techniques, to generate processed historical application creation data. In some implementations, the processed historical application creation data may be in a format that may be used to build and/or train a machine learning model, such as a machine learning model described below. In some implementations, the data processing techniques may include an optical character recognition (OCR) technique, a natural language processing technique, a data normalization technique, a data cleansing technique, a feature engineering technique, and/or the like.

In some implementations, the metric platform may utilize OCR with the historical application creation data in order to convert the historical application creation data into electronic data. Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, passport documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

In some implementations, the metric platform may utilize a natural language processing technique, a computational linguistics technique, a text analysis technique, and/or the like, with the historical application creation data in order to make the historical application creation data (e.g., the processed historical application creation data) analyzable. For example, the metric platform may apply natural language processing to interpret the historical application creation data and generate additional data associated with the potential meaning of data within the historical application creation data. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, the metric platform may utilize a data normalization technique to process the historical application creation data and to eliminate and/or reduce redundant data from the historical application creation data. The data normalization technique may include identifying values or portions of data that are repeated unnecessarily in a file, data structure, and/or the like (e.g., in records or fields, within a table, and/or the like); eliminating such values or portions of data from the file, data structure, and/or the like; converting such values or portions of data from a differing and/or nonstandard format to a same and/or standard format, and/or the like; and/or one or more other data normalization techniques. For example, the data normalization technique may include database normalization, such as may be applied to a relational database to organize columns (attributes) and tables (relations) of a relational database to reduce data redundancy and improve data integrity. Database normalization may involve arranging attributes in relations based on dependencies between attributes, ensuring that the dependencies are properly enforced by database integrity constraints. Normalization may be accomplished by applying formal rules either by a process of synthesis (e.g., creating a normalized database design based on a known set of dependencies) or decomposition (e.g., improving an existing (insufficiently normalized) database design based on the known set of dependencies).

In some implementations, the metric platform may utilize a data cleansing technique to process the historical application creation data and to detect and/or correct corrupt or inaccurate data from the historical application creation data. The data cleansing technique may include detecting and correcting (or removing) corrupt or inaccurate data (e.g., records from a record set, table, or database), and then replacing, modifying, or deleting the corrupt or inaccurate data. The data cleansing technique may detect and correct inconsistencies originally caused by user entry errors, by corruption in transmission or storage, or by utilization of different definitions for similar data in different data stores. The data cleansing technique may include removing typographical errors or validating and correcting values against a known list of entities. In this case, validation may be strict (e.g., rejecting any address that does not have a valid postal code) or fuzzy (e.g., correcting records that partially match existing, known records). The data cleansing technique may also include cleaning data by cross checking the data with a validated data set, standardizing the data by changing a reference data set to a new standard (e.g., use of standard codes), and/or the like. Additionally, the data cleansing technique may include data enhancement, where data is made more complete by adding related information (e.g., estimating values of missing current assets, liabilities, operating leases, etc.).

In some implementations, the metric platform may utilize a feature engineering technique to process the historical application creation data and to create features that make machine learning models function. The feature engineering technique may include testing features in the historical application creation data, deciding what features to create from the historical application creation data, creating features from the historical application creation data, determining how the features function in a machine learning model, improving the features if necessary, creating more features, and/or the like. The feature engineering technique may transform raw data (e.g., the historical application creation data) into features that better represent an underlying problem to a machine learning model, resulting in improved model accuracy on unseen data.

In some implementations, the metric platform may select one or more of the data processing techniques to process the historical application creation data based on a source of the data. For example, if the historical application creation data is received from a first source, the metric platform may utilize a first data processing technique to process the historical application creation data, if the historical application creation data is received from a second source, the metric platform may utilize a second data processing technique to process the historical application creation data, and/or the like.

In some implementations, the metric platform may select one or more of the data processing techniques to process the historical application creation data based on a type of the data. In some implementations, the metric platform may analyze the historical application creation data and may select the one or more of the data processing techniques based on a result of the analysis (e.g., if the data is of a first data type and a first data processing technique is mapped to the first data type). In some implementations, the metric platform may select multiple data processing techniques and may determine an order of performance of the data processing techniques based on a source of the data, a type of the data, and/or the like.

In this way, the metric platform may process the historical application creation data to generate the processed historical application creation data.

Figure 1C:
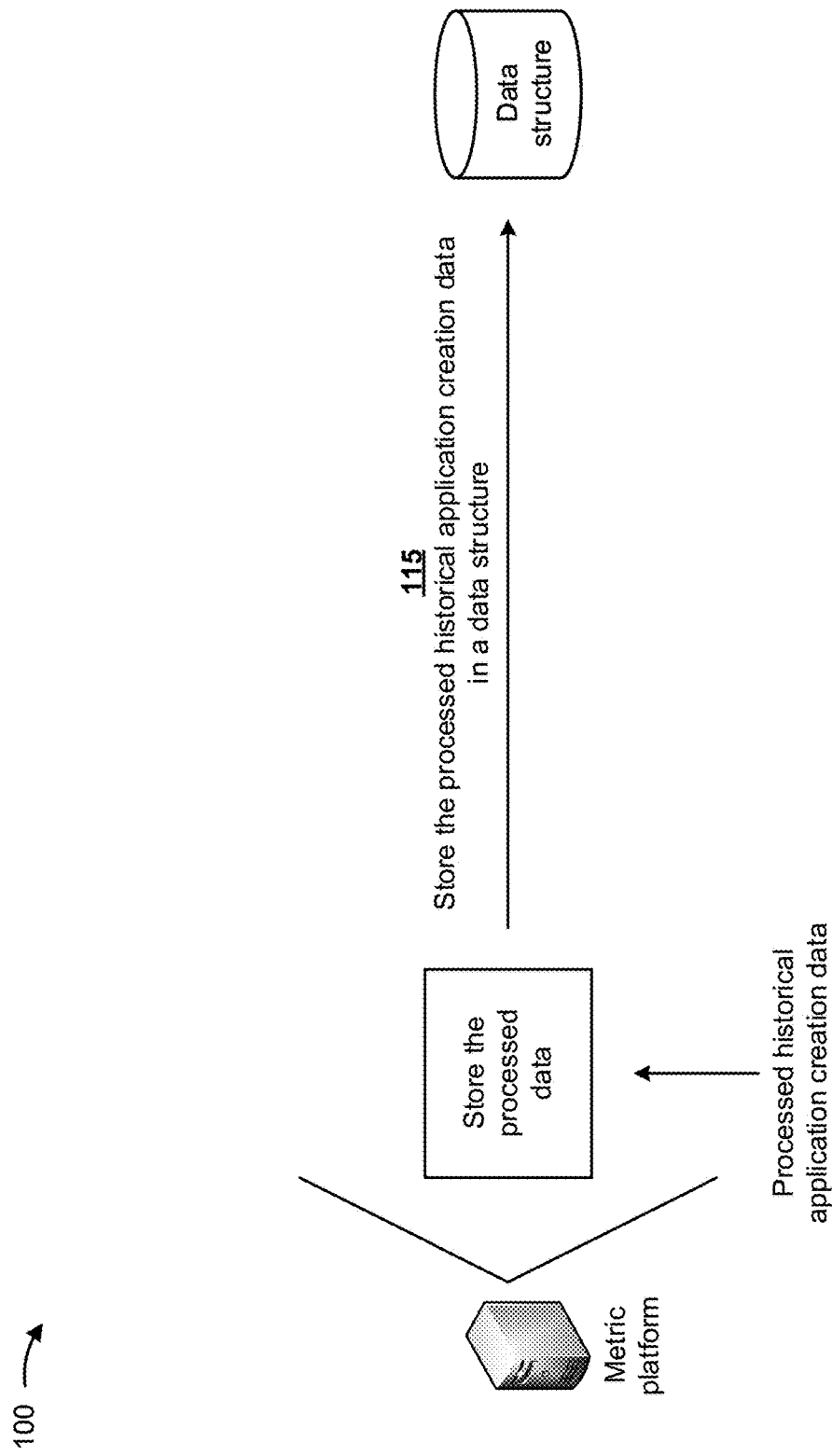

As shown in FIG. 1C, and by reference number 115, the metric platform may store the processed historical application creation data in a data structure (e.g., a database, a table, a list, and/or the like) associated with the metric platform. In some implementations, the metric platform may store other data in the data structure, such as the historical application creation data (e.g., once received), a machine learning model, new application data associated with a new application, one or more predictions generated by the machine learning model for the new application, and/or the like, as described below.

Figure 1D:
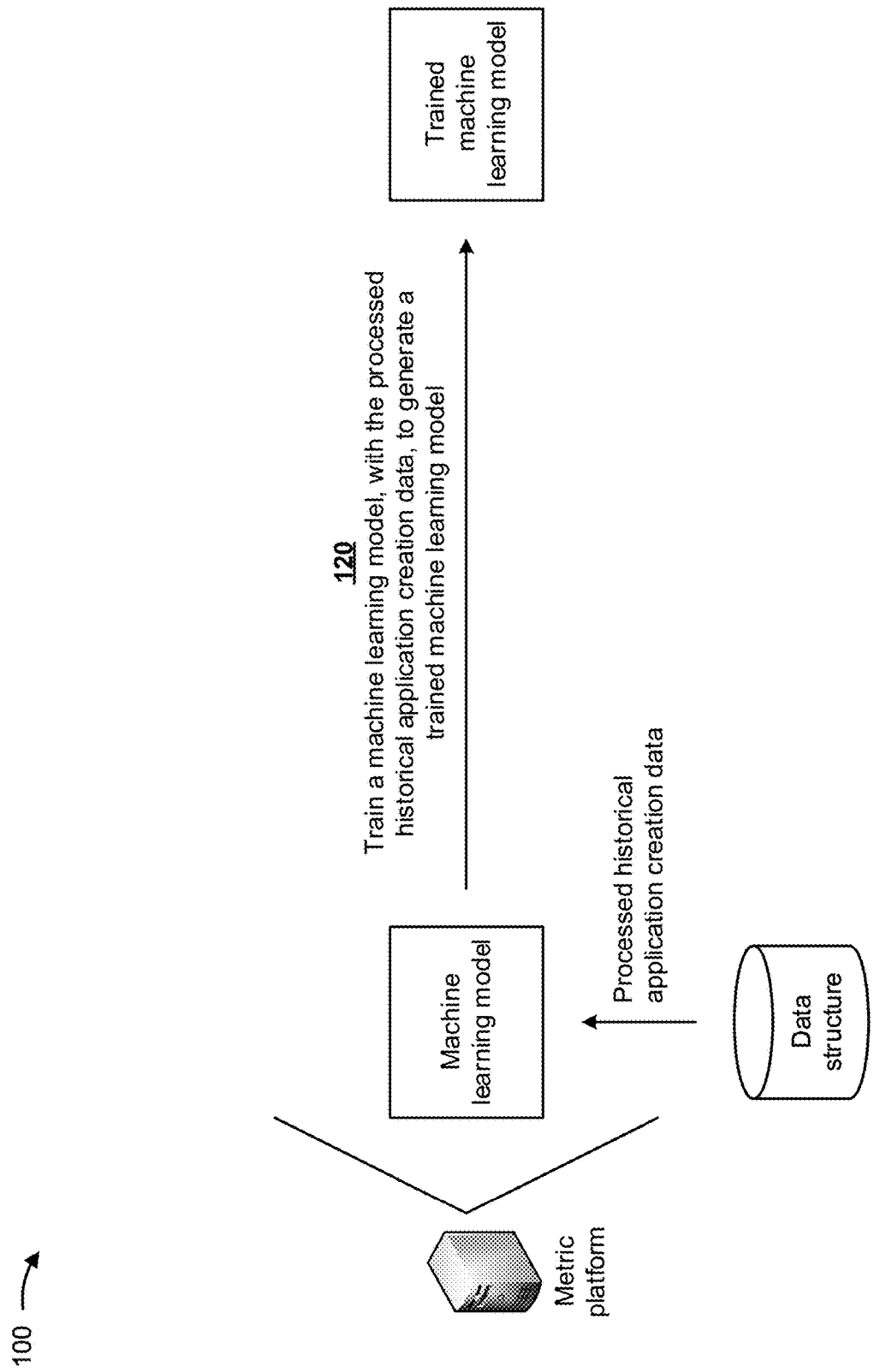

As shown in FIG. 1D, and by reference number 120, the metric platform may train a machine learning model, with the processed historical application creation data, to generate a trained machine learning model. In some implementations, the machine learning model may include a pattern recognition model that generates predictions for a new application. In some implementations, the metric platform may receive the trained machine learning model from another device, and may not train the machine learning model to generate the trained machine learning model.

In some implementations, the metric platform may perform a training operation on the machine learning model with the processed historical application creation data. For example, the metric platform may separate the processed historical application creation data into a training set, a validation set, a test set, and/or the like. The training set may be utilized to train the machine learning model. The validation set may be utilized to validate results generated based on training the machine learning model with the training set. The test set may be utilized to test results generated by the trained machine learning model.

In some implementations, the metric platform may train the machine learning model using, for example, an unsupervised training procedure and based on the training set of the processed historical application creation data. For example, the metric platform may perform dimensionality reduction to reduce the processed historical application creation data to a minimum feature set, thereby reducing resources (e.g., processing resources, memory resources, and/or the like) to train the machine learning model and may apply a classification technique to the minimum feature set.

In some implementations, the metric platform may use a logistic regression classification technique to determine a categorical outcome (e.g., that reliable and/or unreliable applications were previously developed). Additionally, or alternatively, the metric platform may use a naïve Bayesian classifier technique. In this case, the metric platform may perform binary recursive partitioning to split the historical application creation data into partitions and/or branches and use the partitions and/or branches to perform predictions (e.g., that reliable and/or unreliable applications were previously developed). Based on using recursive partitioning, the metric platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the metric platform may use a support vector machine (SVM) classifier technique to generate a non-linear boundary between data points in the training set. In this case, the non-linear boundary is used to classify test data into a particular class.

Additionally, or alternatively, the metric platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the metric platform may use one or more other model training techniques, such as a neural network technique, a latent semantic indexing technique, and/or the like. For example, the metric platform may perform an artificial neural network processing technique (e.g., using a two-layer feedforward neural network architecture, a three-layer feedforward neural network architecture, and/or the like) to perform pattern recognition with regard to optimal regions of the processed historical application creation data. In this case, using the artificial neural network processing technique may improve an accuracy of the trained machine learning model generated by the metric platform by enabling the model to be more robust than unprocessed models to noisy, imprecise, or incomplete data, and by enabling the metric platform to detect patterns and/or trends undetectable to human analysts or systems using less complex techniques.

In some implementations, the metric platform may receive updated historical application creation data in real time and/or periodically (e.g., from one or more software development systems associated with the applications currently being developed). In such implementations, the metric platform may update the trained machine learning model based on the updated historical application creation data.

In some implementations, the machine learning model may receive application creation data associated with a new application as an input and may output one or more predictions associated with the new application based on the input, as described below.

Figure 1E:
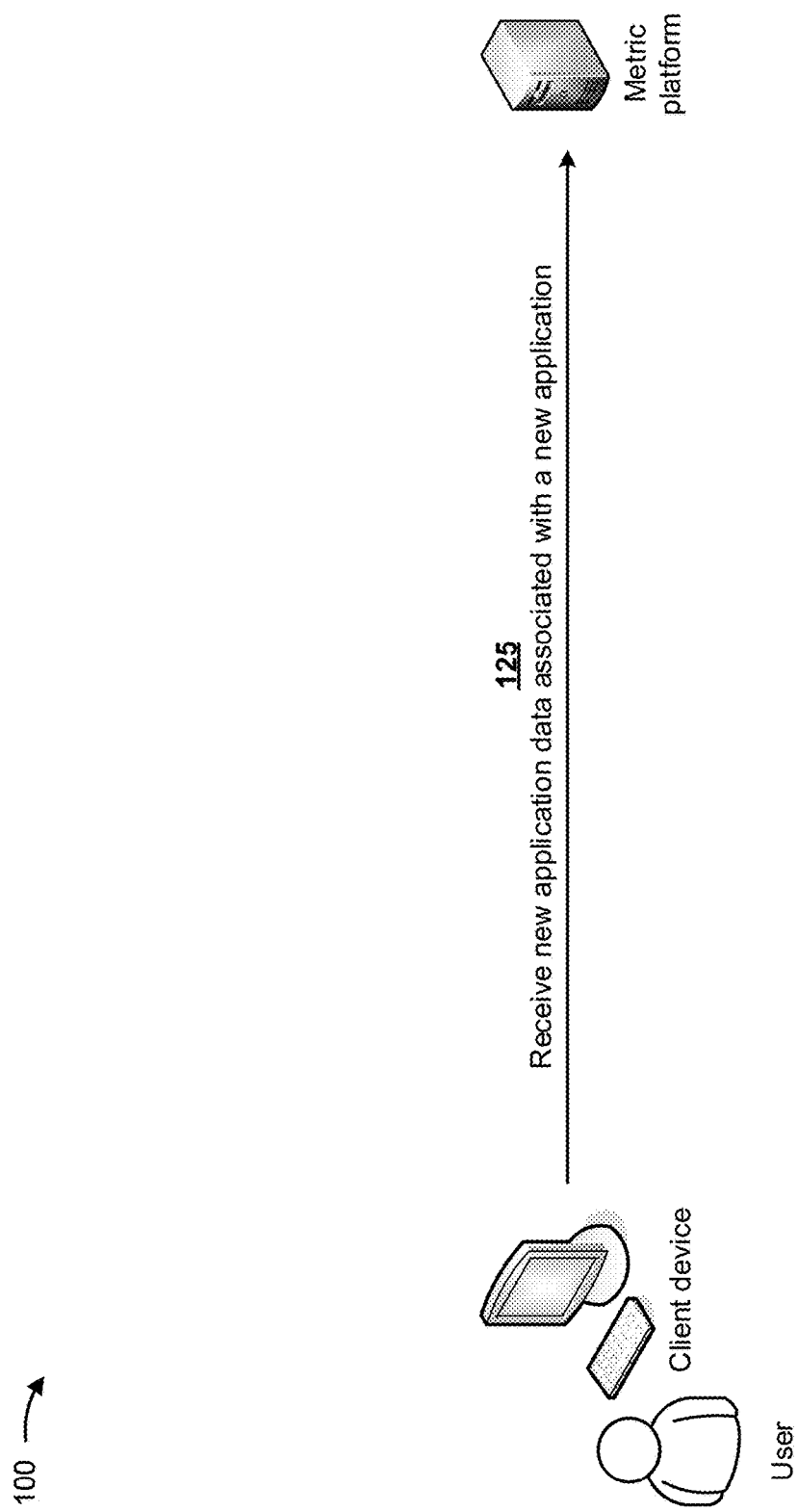

As shown in FIG. 1E, and by reference number 125, the metric platform may receive new application creation data associated with a new application (e.g., data associated with creation of the new application). In some implementations, the new application may be newly written and the new application data may include data identifying source code of the new application, a development environment in which the new application may be developed, a testing environment in which the new application may be tested, a production environment in which the new application may be deployed, and/or the like.

In some implementations, the new application may be at one of a plurality of different phases of the software development process. For example, the new application may be past the development and testing phases of the software development process. In such situations, the new application creation data may include new development data associated with the new application, new build data associated with the new application, new testing data associated with the new application, new artifact data associated with the new application, and/or the like.

The new development data may include data describing tracking updates, defects, and/or the like associated with the new application; data describing review sessions of the new application conducted by a developer and other parties; data describing static analysis performed on the new application; data describing issue tracking associated with the new application; and/or the like.

The new build data may include data describing builds associated with the new application, reporting associated with the new application, documentation from the new application, standardized libraries associated with the new application, packaging procedures associated with the new application, and/or the like.

The new testing data may include data describing unit tests associated with the new application, code coverage tests associated with the new application, service visualization tests associated with the new application, and/or the like.

The new artifact data may include data describing the publishing of artifacts, associated with the new application, from a build phase to a repository that is version controlled.

Figure 1F:
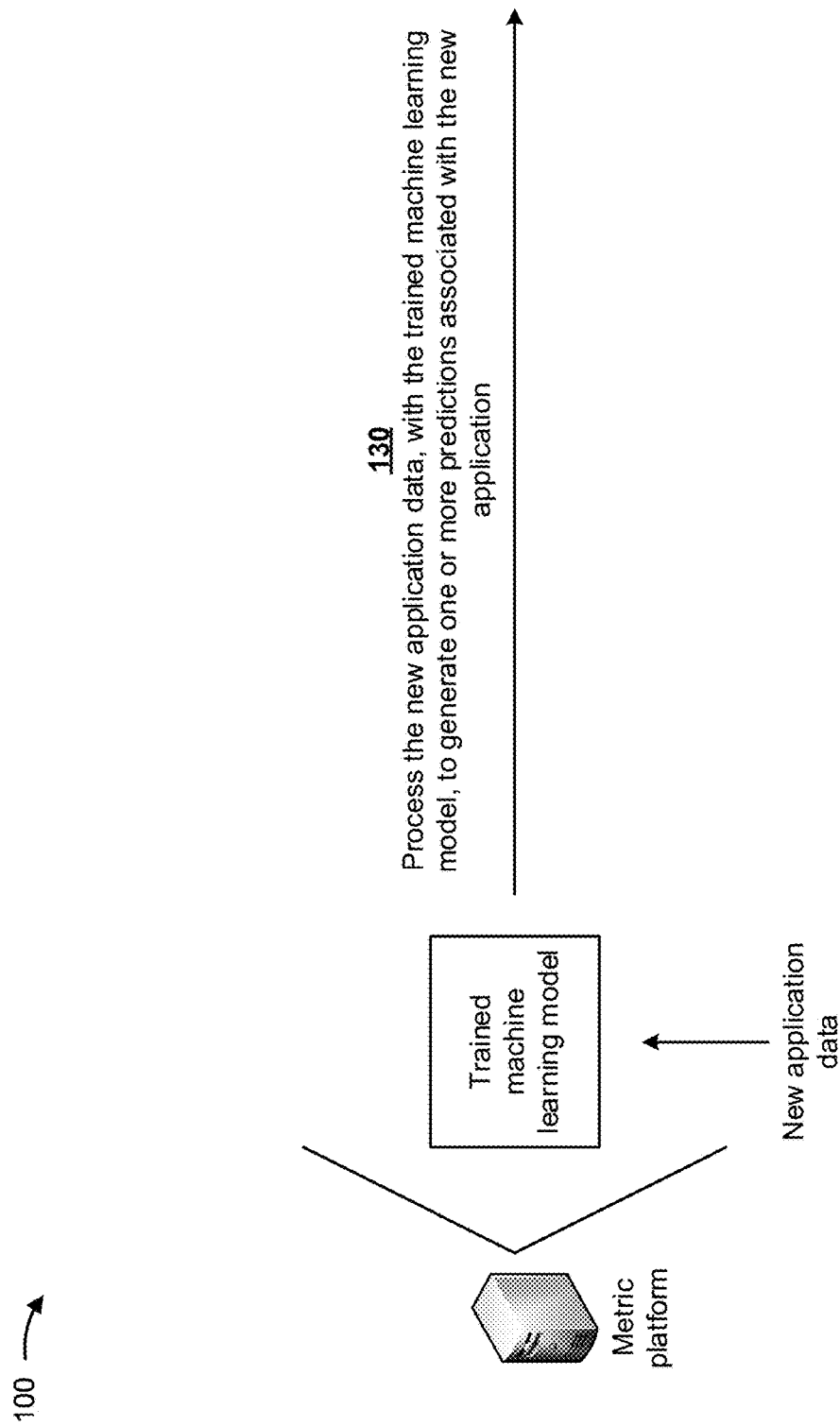

As shown in FIG. 1F, and by reference number 130, the metric platform may process the new application data, with the trained machine learning model, to generate one or more predictions associated with the new application. In some implementations, the one or more predictions may include predictions of metrics (e.g., providing indications of whether the new application will succeed or fail at this phase) associated with a development phase of the new application, predictions of metrics associated with a build phase of the new application, predictions of metrics associated with a testing phase of the new application, predictions of metrics associated with an artifact phase of the new application, predictions of metrics associated with a deployment phase of the new application, predictions of metrics associated with a release phase of the new application, predictions of metrics associated with a monitoring phase of the new application, predictions of metrics associated with a support phase of the new application, and/or the like.

In some implementations, the metrics may include metrics associated with a lead time (e.g., time required for an idea to be developed and delivered as software); a cycle time (e.g., time required to change the software and implement that change); open and/or close rates (e.g., production issues reported in a specific time period); production (e.g., how much work is done and an efficiency of software development teams); active days (e.g., how much time a software developer contributes code to a software development project); assignment scope (e.g., an amount of code that a programmer can maintain and support in a year); efficiency (e.g., an amount of productive code contributed by a software developer); code churn (e.g., a quantity of lines of code that were modified, added, and/or deleted in a specified period of time); impact (e.g., an effect of a code change on the software development project); a mean time between failures (MTBF) and a mean time to recover/repair (MTTR) (e.g., how software performs in a production environment); an application crash rate (ACR); defect removal efficiency (DRE) (e.g., how many defects were detected); and/or the like.

Figure 1G:
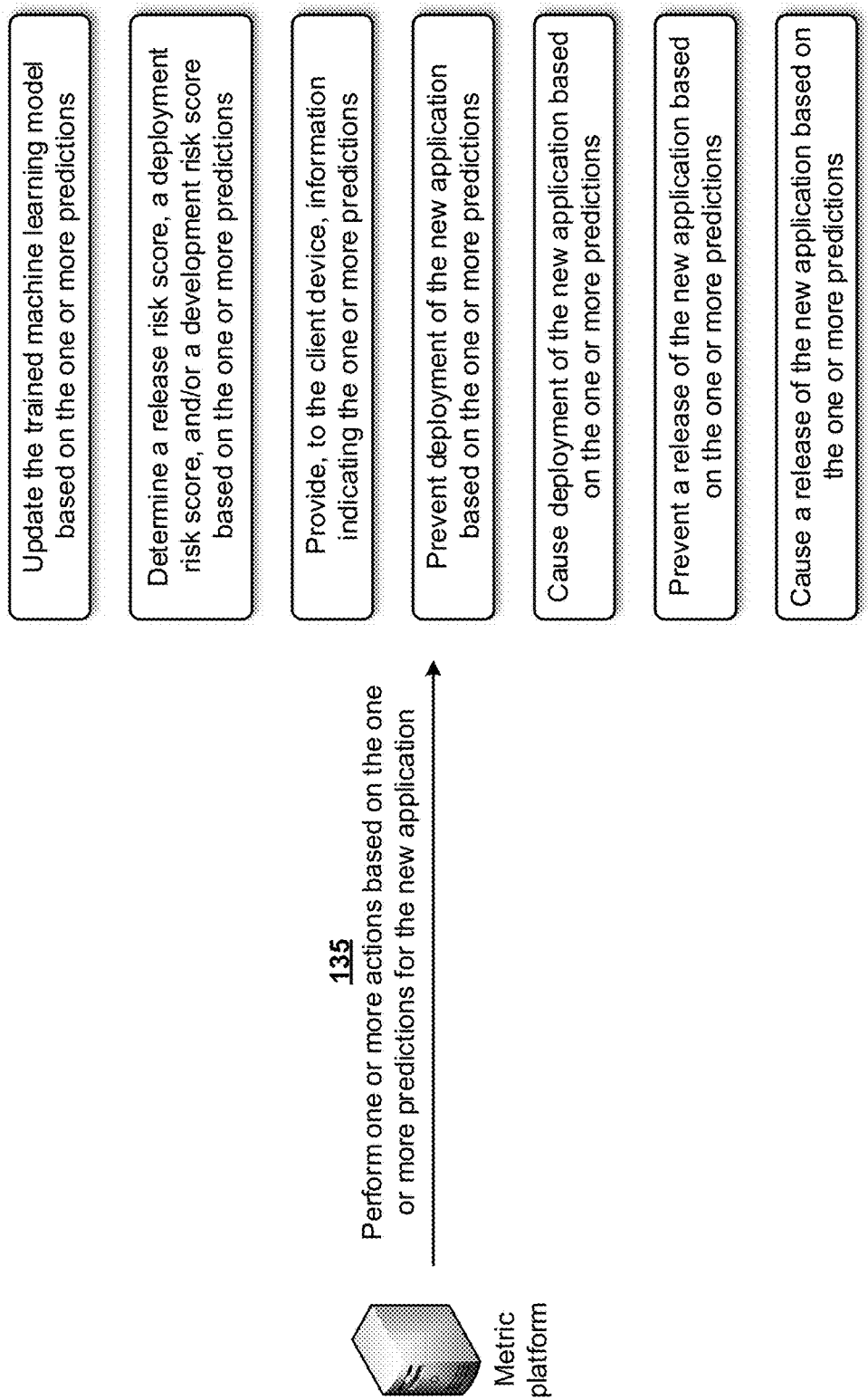

As shown in FIG. 1G, and by reference number 135, the metric platform may perform one or more actions based on the one or more predictions for the new application. For example, the one or more actions may include the metric platform updating the trained machine learning model based on the one or more predictions. In this way, the metric platform improves the accuracy of the trained machine learning model when processing new data, which conserves computing resources relative to using a less accurate machine learning model.

In some implementations, the one or more actions may include the metric platform determining a release risk score, a deployment risk score, and/or a development risk score for the new application based on the one or more predictions. In this way, the metric platform determines risks that inform developers of whether to proceed with the new application, which conserves resources that would otherwise be wasted developing applications that will fail. In some implementations, the release risk score may be determined based on allotting weights and/or scores to the metrics associated with a release phase of the new application. The deployment risk score may be determined based on allotting weights and/or scores to the metrics associated with a deployment phase of the new application. The development risk score may be determined based on allotting weights and/or scores to the metrics associated with a development phase of the new application. In some implementations, the metric platform may determine whether the new application is to be released, deployed, and/or developed based on the release risk score, the deployment risk score, and/or the development risk score for the new application.

In some implementations, the one or more actions may include the metric platform providing, to the client device, information indicating the one or more predictions (e.g., via a user interface). In this way, the metric platform alerts the user of potential issues with the new application so that the user may address the potential issues, which conserves computing resources relative to the user proceeding without being alerted of the potential issues.

In some implementations, the one or more actions may include the metric platform preventing deployment of the new application based on the one or more predictions. In this way, the metric platform prevents deployment of defective applications, which conserves resources that would otherwise be wasted deploying applications that will fail.

In some implementations, the one or more actions may include the metric platform causing deployment of the new application based on the one or more predictions. In this way, the metric platform automatically deploys applications that are not defective and will be successfully deployed.

In some implementations, the one or more actions may include the metric platform preventing release of the new application based on the one or more predictions. In this way, the metric platform prevents generation of releases for defective applications, which conserves resources that would otherwise be wasted generating releases for applications that will fail.

In some implementations, the one or more actions may include the metric platform causing a release of the new application based on the one or more predictions. In this way, the metric platform automatically generates releases for applications that are not defective.

In some implementations, the one or more actions may include the metric platform preventing development of the new application based on the one or more predictions. In this way, the metric platform prevents development of defective applications, which conserves resources that would otherwise be wasted developing applications that will fail.

In some implementations, the one or more actions may include the metric platform causing development of the new application based on the one or more predictions. In this way, the metric platform automatically develops applications that are not defective and will be successfully developed.

In some implementations, the one or more actions may include the metric platform modifying the new application to address the one or more predictions; causing devices in a network to install the new application; identifying devices in a network that are to install the new application and causing those devices to install the new application; causing a server, hosting an electronic store, to publish the new application; causing a device to modify the new application; installing the new application in devices in a network; and/or the like.

In this way, several different stages of the process for predicting metrics associated with an application development process may be automated with a machine learning model, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed, or were previously performed using subjective human intuition or input. For example, currently there does not exist a technique that utilizes a machine learning model to predict metrics for an application development process in the manner described herein. Further, automating the process for predicting metrics associated with an application development process conserves computing resources (e.g., processing resources, memory resources, and/or the like) that would otherwise be wasted in using a less efficient technique to predict such metrics.

As indicated above, FIGS. 1A-1G are provided merely as examples. Other examples may differ from what is described with regard to FIGS. 1A-1G.

Figure 2:
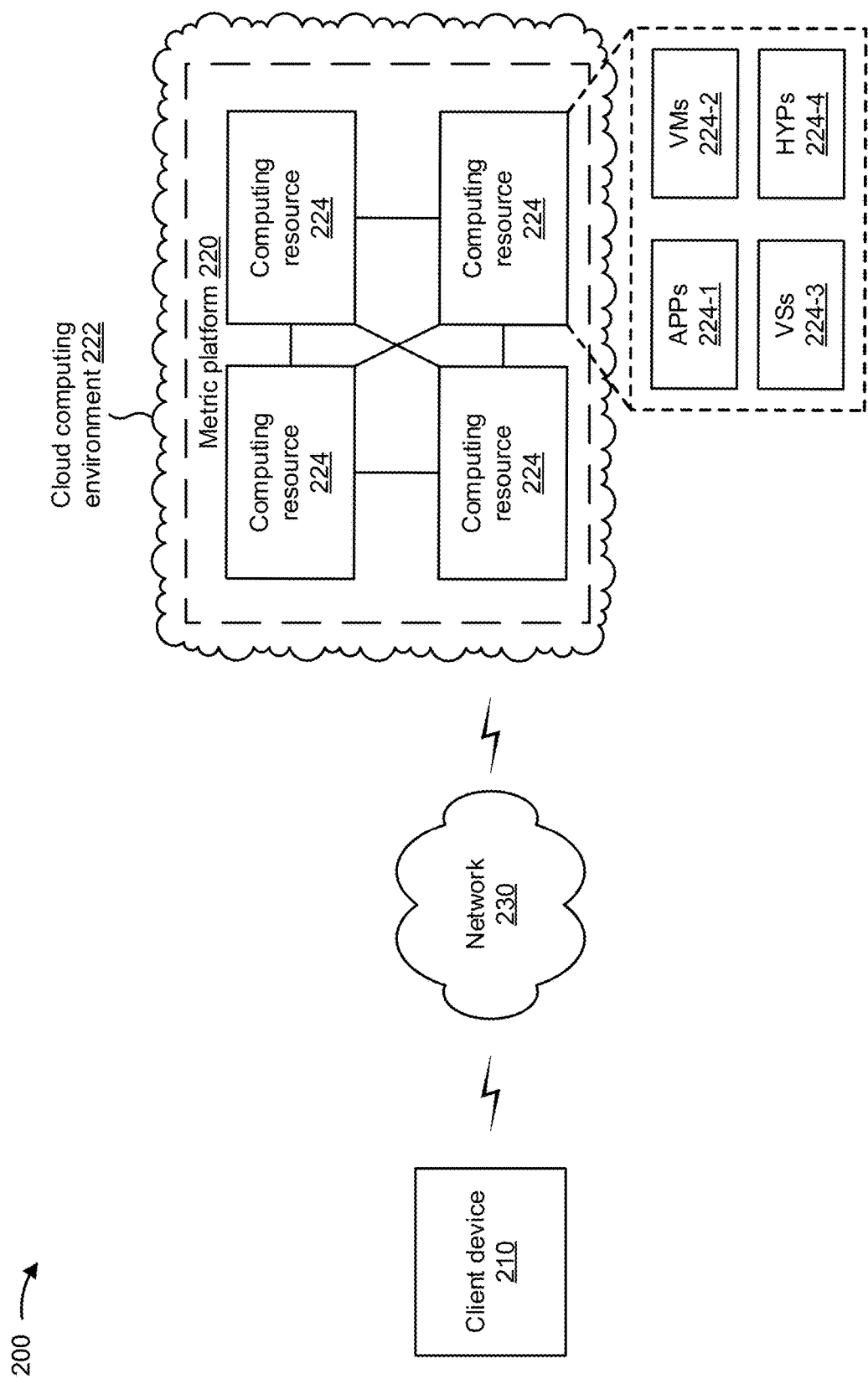
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a client device 210, a metric platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to metric platform 220.

Metric platform 220 includes one or more devices that may utilize a machine learning model to predict metrics for an application development process. In some implementations, metric platform 220 may be modular such that certain software components may be swapped in or out depending on a particular need. As such, metric platform 220 may be easily and/or quickly reconfigured for different uses. In some implementations, metric platform 220 may receive information from and/or transmit information to one or more client devices 210.

In some implementations, as shown, metric platform 220 may be hosted in a cloud computing environment 222. Notably, while implementations described herein describe metric platform 220 as being hosted in cloud computing environment 222, in some implementations, metric platform 220 may be non-cloud-based (i.e., may be implemented outside of a cloud computing environment) or may be partially cloud-based.

Cloud computing environment 222 includes an environment that may host metric platform 220. Cloud computing environment 222 may provide computation, software, data access, storage, etc. services that do not require end-user knowledge of a physical location and configuration of system(s) and/or device(s) that host metric platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host metric platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with metric platform 220 and/or any other software capable of being provided via cloud computing environment 222. In some implementations, one application 224-1 may send/ receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of metric platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
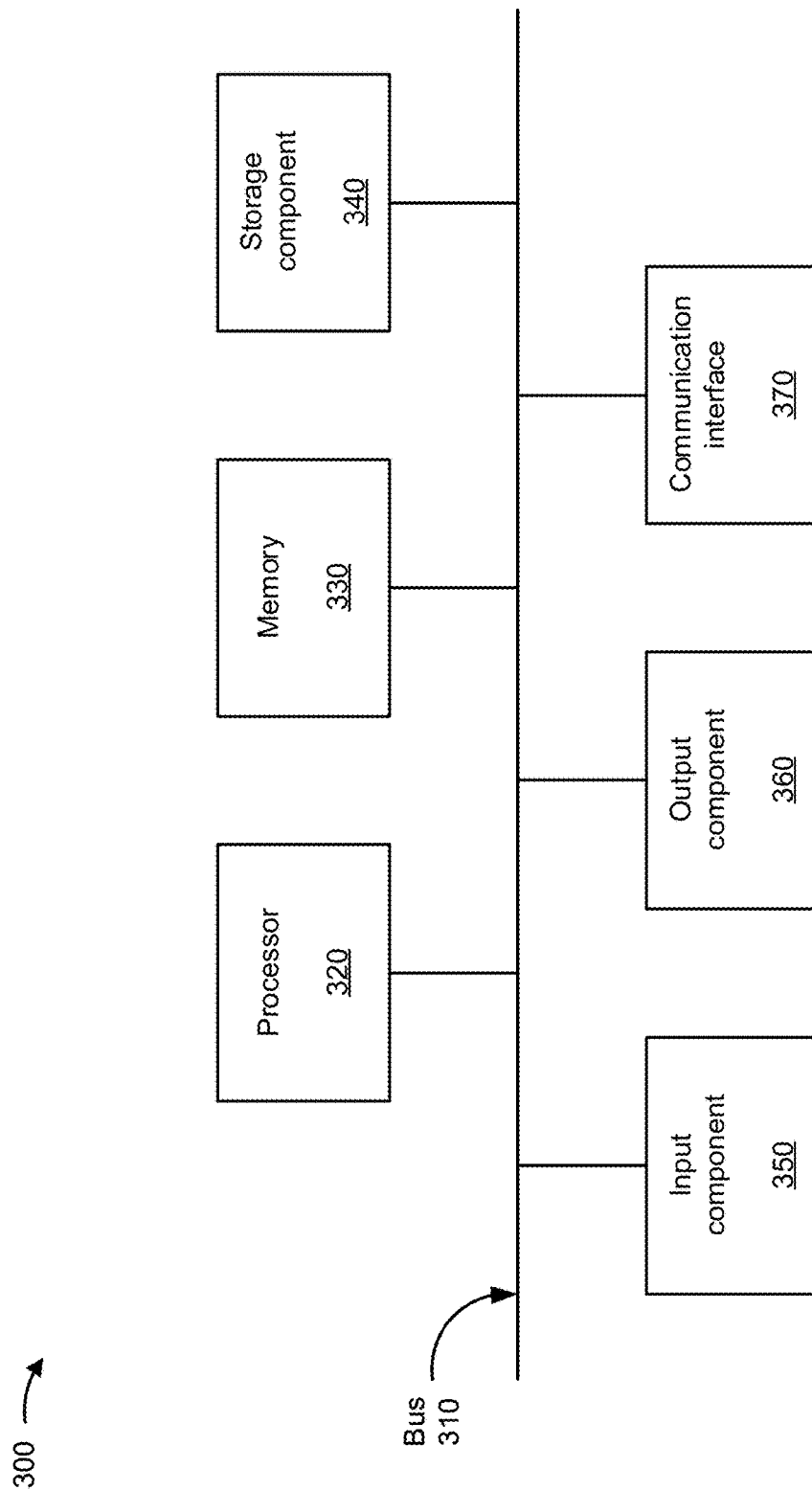
FIG. 3 is a diagram of example components of one or more devices of FIG. 2.

FIG. 3 is a diagram of example components of a device 300. Device 300 may correspond to client device 210, metric platform 220, and/or computing resource 224. In some implementations, client device 210, metric platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
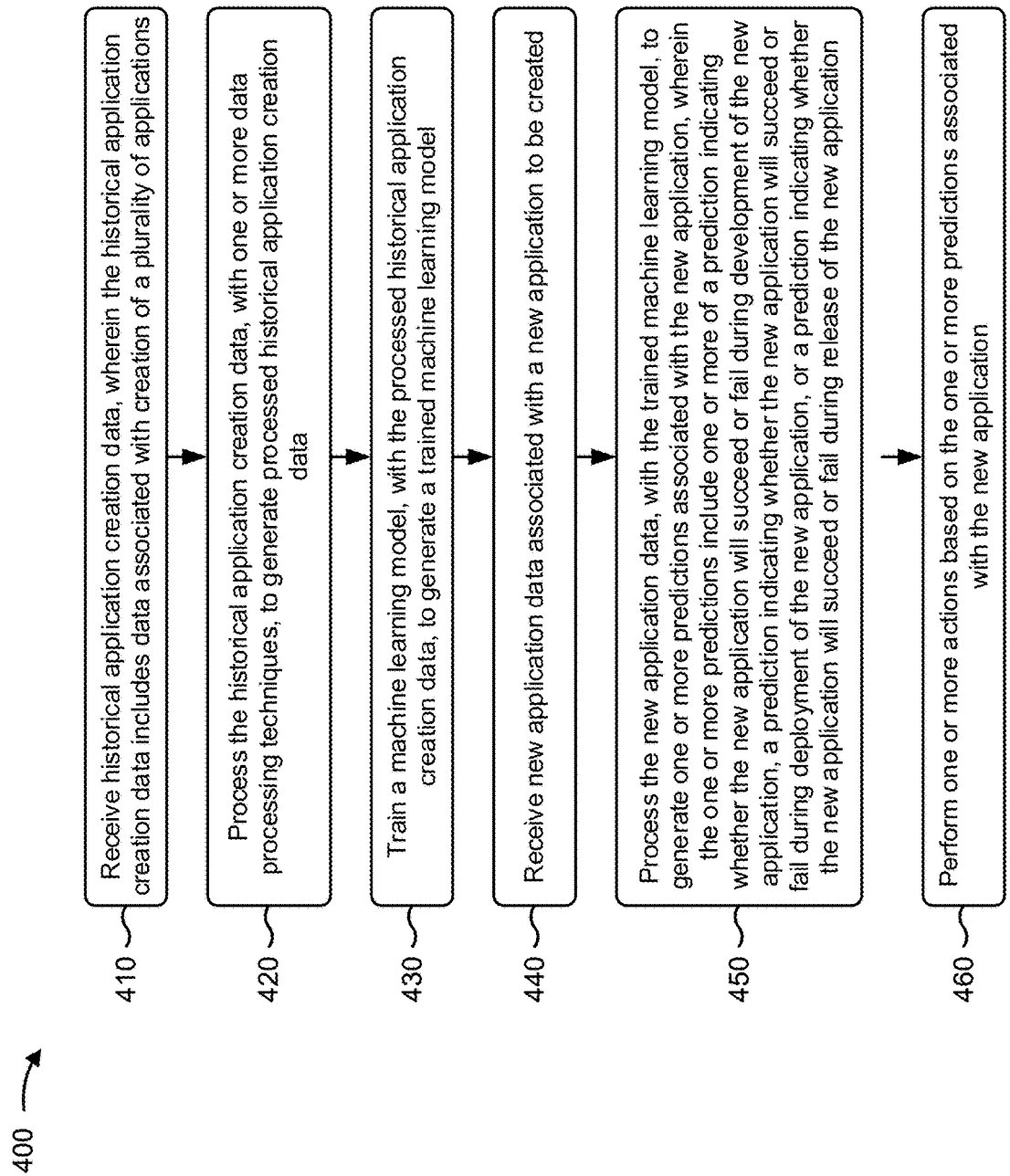

FIG. 4 is a flow chart of an example process 400 for utilizing a machine learning model to predict metrics for an application development process. In some implementations, one or more process blocks of FIG. 4 may be performed by a metric platform (e.g., metric platform 220). In some implementations, one or more process blocks of FIG. 4 may be performed by another device or a group of devices separate from or including the metric platform, such as a client device (e.g., client device 210).

As shown in FIG. 4, process 400 may include receiving historical application creation data, wherein the historical application creation data includes data associated with creation of a plurality of applications (block 410). For example, the metric platform (e.g., using computing resource 224, processor 320, communication interface 370, and/or the like) may receive historical application creation data, as described above in connection with FIGS. 1A-2. In some implementations, the historical application creation data may include data associated with creation of a plurality of applications.

As further shown in FIG. 4, process 400 may include processing the historical application creation data, with one or more data processing techniques, to generate processed historical application creation data (block 420). For example, the metric platform (e.g., using computing resource 224, processor 320, memory 330, and/or the like) may process the historical application creation data, with one or more data processing techniques, to generate processed historical application creation data, as described above in connection with FIGS. 1A-2.

As further shown in FIG. 4, process 400 may include training a machine learning model, with the processed historical application creation data, to generate a trained machine learning model (block 430). For example, the metric platform (e.g., using computing resource 224, processor 320, storage component 340, and/or the like) may train a machine learning model, with the processed historical application creation data, to generate a trained machine learning model, as described above in connection with FIGS. 1A-2.

As further shown in FIG. 4, process 400 may include receiving new application data associated with a new application to be created (block 440). For example, the metric platform (e.g., using computing resource 224, processor 320, communication interface 370, and/or the like) may receive new application data associated with a new application to be created, as described above in connection with FIGS. 1A-2.

As further shown in FIG. 4, process 400 may include processing, by the device, the new application data, with the trained machine learning model, to generate one or more predictions associated with the new application, wherein the one or more predictions include one or more of a prediction indicating whether the new application will succeed or fail during development of the new application, a prediction indicating whether the new application will succeed or fail during deployment of the new application, or a prediction indicating whether the new application will succeed or fail during release of the new application (block 450). For example, the metric platform (e.g., using computing resource 224, processor 320, memory 330, and/or the like) may process the new application data, with the trained machine learning model, to generate one or more predictions associated with the new application, as described above in connection with FIGS. 1A-2. In some implementations, wherein the one or more predictions may include one or more of a prediction indicating whether the new application will succeed or fail during development of the new application, a prediction indicating whether the new application will succeed or fail during deployment of the new application, and/or a prediction indicating whether the new application will succeed or fail during release of the new application.

As further shown in FIG. 4, process 400 may include performing one or more actions based on the one or more predictions associated with the new application (block 460). For example, the metric platform (e.g., using computing resource 224, processor 320, memory 330, communication interface 370, and/or the like) may perform one or more actions based on the one or more predictions associated with the new application, as described above in connection with FIGS. 1A-2.

Process 400 may include additional implementations, such as any single implementation or any combination of implementations described below and/or described with regard to any other process described herein.

In some implementations, the metric platform, when performing the one or more actions, may update the trained machine learning model based on the one or more predictions; may determine a release risk score associated with releasing the new application, a deployment risk score associated with deploying the new application, and/or a development risk score associated with developing the new application; and/or may provide, to a client device, information indicating the one or more predictions.

In some implementations, the metric platform, when performing the one or more actions, may prevent development of the new application based on the one or more predictions, may cause development of the new application based on the one or more predictions, may prevent deployment of the new application based on the one or more predictions, may cause deployment of the new application based on the one or more predictions, may prevent a release of the new application based on the one or more predictions, and/or may cause a release of the new application based on the one or more predictions.

In some implementations, the one or more data processing techniques may include an optical character recognition (OCR) technique, a natural language processing technique, a data normalization technique, a data cleansing technique, and/or a feature engineering technique. In some implementations, the historical application creation data may include development data associated with the plurality of applications, build data associated with the plurality of applications, testing data associated with the plurality of applications, artifact data associated with the plurality of applications, deployment data associated with the plurality of applications, release data associated with the plurality of applications, monitored data associated with the plurality of applications, and/or support data associated with the plurality of applications.

In some implementations, the metric platform may store the processed historical application creation data in a data structure. In some implementations, the metric platform, when receiving the historical application creation data, may receive the historical application creation data in real time and/or periodically from one or more software development systems.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
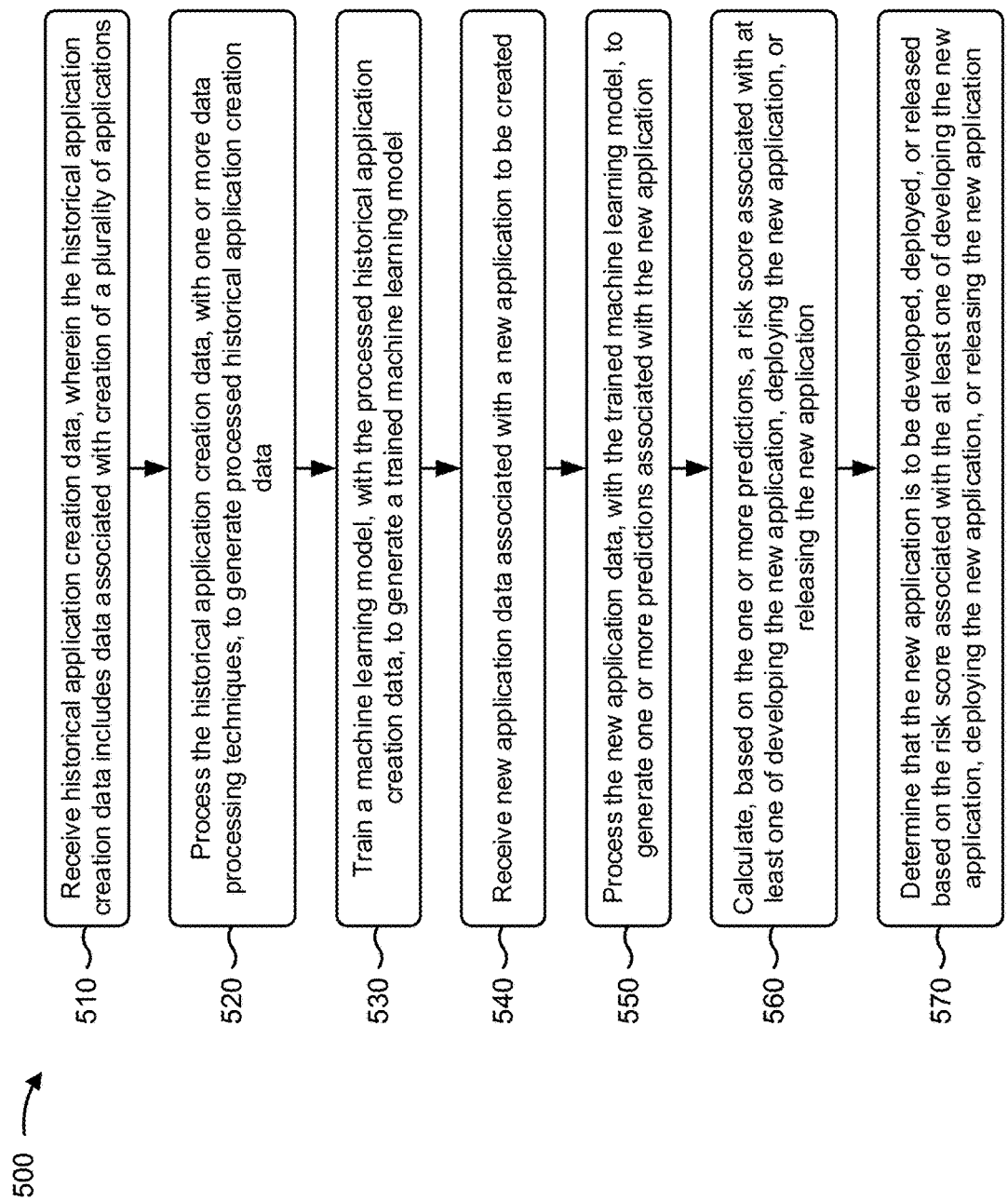

FIG. 5 is a flow chart of an example process 500 for utilizing a machine learning model to predict metrics for an application development process. In some implementations, one or more process blocks of FIG. 5 may be performed by a metric platform (e.g., metric platform 220). In some implementations, one or more process blocks of FIG. 5 may be performed by another device or a group of devices separate from or including the metric platform, such as a client device (e.g., client device 210).

As shown in FIG. 5, process 500 may include receiving historical application creation data, wherein the historical application creation data includes data associated with creation of a plurality of applications (block 510). For example, the metric platform (e.g., using computing resource 224, processor 320, communication interface 370, and/or the like) may receive historical application creation data, as described above in connection with FIGS. 1A-2. In some implementations, the historical application creation data may include data associated with creation of a plurality of applications.

As further shown in FIG. 5, process 500 may include processing the historical application creation data, with one or more data processing techniques, to generate processed historical application creation data (block 520). For example, the metric platform (e.g., using computing resource 224, processor 320, memory 330, and/or the like) may process the historical application creation data, with one or more data processing techniques, to generate processed historical application creation data, as described above in connection with FIGS. 1A-2.

As further shown in FIG. 5, process 500 may include training a machine learning model, with the processed historical application creation data, to generate a trained machine learning model (block 530). For example, the metric platform (e.g., using computing resource 224, processor 320, storage component 340, and/or the like) may train a machine learning model, with the processed historical application creation data, to generate a trained machine learning model, as described above in connection with FIGS. 1A-2.

As further shown in FIG. 5, process 500 may include receiving new application data associated with a new application to be created (block 540). For example, the metric platform (e.g., using computing resource 224, processor 320, communication interface 370, and/or the like) may receive new application data associated with a new application to be created, as described above in connection with FIGS. 1A-2.

As further shown in FIG. 5, process 500 may include processing the new application data, with the trained machine learning model, to generate one or more predictions associated with the new application (block 550). For example, the metric platform (e.g., using computing resource 224, processor 320, memory 330, and/or the like) may process the new application data, with the trained machine learning model, to generate one or more predictions associated with the new application, as described above in connection with FIGS. 1A-2.

As further shown in FIG. 5, process 500 may include calculating a risk score associated with at least one of developing the new application, deploying the new application, or releasing the new application (block 560). For example, the metric platform (e.g., using computing resource 224, processor 320, storage component 340, and/or the like) may calculate a risk score associated with developing the new application, deploying the new application, and/or releasing the new application, as described above in connection with FIGS. 1A-2.

As further shown in FIG. 5, process 500 may include determining that the new application is to be developed, deployed, or released based on the risk score associated with the at least one of developing the new application, deploying the new application, or releasing the new application (block 570). For example, the metric platform (e.g., using computing resource 224, processor 320, memory 330, and/or the like) may determine that the new application is to be developed, deployed, or released based on the risk score associated with the at least one of developing the new application, deploying the new application, or releasing the new application, as described above in connection with FIGS. 1A-2.

Process 500 may include additional implementations, such as any single implementation or any combination of implementations described below and/or described with regard to any other process described herein.

In some implementations, the metric platform may perform one or more actions based on the one or more predictions associated with the new application. In some implementations, the metric platform, when performing the one or more actions, may update the trained machine learning model based on the one or more predictions, may provide, to a client device, information indicating the one or more predictions, may prevent development of the new application based on the one or more predictions, may cause development of the new application based on the one or more predictions, may prevent deployment of the new application based on the one or more predictions, may cause deployment of the new application based on the one or more predictions, may prevent a release of the new application based on the one or more predictions, and/or may cause a release of the new application based on the one or more predictions.

In some implementations, the metric platform may cause the new application to be developed, deployed, and/or released based on determining that the new application is to be developed, deployed, and/or released. In some implementations, the historical application creation data may include development data associated with the plurality of applications, build data associated with the plurality of applications, test data associated with the plurality of applications, artifact data associated with the plurality of applications, deployment data associated with the plurality of applications, release data associated with the plurality of applications, monitored data associated with the plurality of applications, and/or support data associated with the plurality of applications.

In some implementations, the metric platform may store the processed historical application creation data and the trained machine learning model in a data structure. In some implementations, the metric platform may receive updated historical application creation data in real time and/or periodically from one or more software development systems associated with the plurality of applications, and may update the trained machine learning model based on the updated historical application creation data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing a machine learning model to predict metrics for an application development process. In some implementations, one or more process blocks of FIG. 6 may be performed by a metric platform (e.g., metric platform 220). In some implementations, one or more process blocks of FIG. 6 may be performed by another device or a group of devices separate from or including the metric platform, such as a client device (e.g., client device 210).

As shown in FIG. 6, process 600 may include receiving historical application creation data, wherein the historical application creation data includes one or more of: development data associated with a plurality of applications, build data associated with the plurality of applications, test data associated with the plurality of applications, artifact data associated with the plurality of applications, deployment data associated with the plurality of applications, release data associated with the plurality of applications, monitored data associated with the plurality of applications, or support data associated with the plurality of applications (block 610). For example, the metric platform (e.g., using computing resource 224, processor 320, communication interface 370, and/or the like) may receive historical application creation data, as described above in connection with FIGS. 1A-2. In some implementations, the historical application creation data may include development data associated with a plurality of applications, build data associated with the plurality of applications, test data associated with the plurality of applications, artifact data associated with the plurality of applications, deployment data associated with the plurality of applications, release data associated with the plurality of applications, monitored data associated with the plurality of applications, and/or support data associated with the plurality of applications.

As further shown in FIG. 6, process 600 may include processing the historical application creation data, with one or more data processing techniques, to generate processed historical application creation data (block 620). For example, the metric platform (e.g., using computing resource 224, processor 320, memory 330, and/or the like) may process the historical application creation data, with one or more data processing techniques, to generate processed historical application creation data, as described above in connection with FIGS. 1A-2.

As further shown in FIG. 6, process 600 may include training a machine learning model, with the processed historical application creation data, to generate a trained machine learning model (block 630). For example, the metric platform (e.g., using computing resource 224, processor 320, storage component 340, and/or the like) may train a machine learning model, with the processed historical application creation data, to generate a trained machine learning model, as described above in connection with FIGS. 1A-2.

As further shown in FIG. 6, process 600 may include receiving new application data associated with a new application to be created (block 640). For example, the metric platform (e.g., using computing resource 224, processor 320, communication interface 370, and/or the like) may receive new application data associated with a new application to be created, as described above in connection with FIGS. 1A-2.

As further shown in FIG. 6, process 600 may include processing the new application data, with the trained machine learning model, to generate one or more predictions associated with the new application, wherein the one or more predictions include one or more of a prediction of a metric associated with a development phase of the new application, a prediction of a metric associated with a deployment phase of the new application, or a prediction of a metric associated with a release phase of the new application (block 650). For example, the metric platform (e.g., using computing resource 224, processor 320, memory 330, and/or the like) may process the new application data, with the trained machine learning model, to generate one or more predictions associated with the new application, as described above in connection with FIGS. 1A-2. In some implementations, the one or more predictions may include one or more of a prediction of a metric associated with a development phase of the new application, a prediction of a metric associated with a deployment phase of the new application, or a prediction of a metric associated with a release phase of the new application As further shown in FIG. 6, process 600 may include performing one or more actions based on the one or more predictions associated with the new application (block 660). For example, the metric platform (e.g., using computing resource 224, processor 320, memory 330, communication interface 370, and/or the like) may perform one or more actions based on the one or more predictions associated with the new application, as described above in connection with FIGS. 1A-2.

Process 600 may include additional implementations, such as any single implementation or any combination of implementations described below and/or described with regard to any other process described herein.

In some implementations, the metric platform, when performing the one or more actions, may update the trained machine learning model based on the one or more predictions, may determine a release risk score associated with releasing the new application, may determine a deployment risk score associated with deploying the new application, may determine a development risk score associated with developing the new application, and/or may provide, to a client device, information indicating the one or more predictions.

In some implementations, the metric platform, when performing the one or more actions, may prevent development of the new application based on the one or more predictions, may cause development of the new application based on the one or more predictions, may prevent deployment of the new application based on the one or more predictions, may cause deployment of the new application based on the one or more predictions, may prevent a release of the new application based on the one or more predictions, and/or may cause a release of the new application based on the one or more predictions.

In some implementations, the one or more data processing techniques may include an optical character recognition (OCR) technique, a natural language processing technique, a data normalization technique, a data cleansing technique, and/or a feature engineering technique. In some implementations, the machine learning model may include a pattern recognition model. In some implementations, the metric platform may receive updated historical application creation data in real time and/or periodically from one or more software development systems associated with the plurality of applications, and may update the trained machine learning model based on the updated historical application creation data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, new application data associated with a new application to be created, the new application data identifying source code of the new application and identifying an environment associated with the new application;
    processing, by the device, the new application data, with a trained machine learning model, to generate one or more predictions associated with the new application,
        wherein the trained machine learning model is trained with modified historical application creation data that includes historical support data indicating notifications that were communicated in association with one or more actions related to previously developed applications,
        wherein the modified historical application creation data is generated by modifying historical application creation data based on utilizing a data cleansing technique that cross checks the historical application creation data with a validated data set,
        wherein the one or more predictions include a prediction indicating whether the new application will succeed or fail, and
        wherein the one or more predictions are generated based on one or more partitions partitioned from the modified historical application creation data;
    updating, by the device, the trained machine learning model based on the one or more predictions;
    providing, by the device, information indicating the one or more predictions; and
    performing, by the device, one or more of:
        preventing development of the new application based on the one or more predictions;
        causing development of the new application based on the one or more predictions;
        preventing deployment of the new application based on the one or more predictions;
        causing deployment of the new application based on the one or more predictions;
        preventing release of the new application based on the one or more predictions; and
        causing release of the new application based on the one or more predictions.

2. The method of claim 1, wherein processing the new application data comprises:
    providing, as input to the trained machine learning model, the new application data; and
    receiving, as output from the trained machine learning model, the one or more predictions.

3. The method of claim 1, wherein the new application data further identifies another one of the one or more of:
    a development environment,
    a testing environment, or
    a production environment.

4. The method of claim 1, wherein the new application data comprises at least one of:
    new development data associated with the new application,
    new build data associated with the new application,
    new testing data associated with the new application, or
    new artifact data associated with the new application.

5. The method of claim 1, further comprising:
    causing the new application to be at least one of developed, deployed, or released based on at least one of a release risk score, a deployment risk score, or a development risk score.

6. The method of claim 1, further comprising:
modifying the new application to address the one or more predictions.

7. The method of claim 1, wherein the prediction further indicates whether the new application will succeed or fail during at least one of:
development of the new application,
deployment of the new application, or
release of the new application.

8. A device, comprising:
one or more memories; and
one or more processors communicatively coupled to the one or more memories, configured to:
receive new application data associated with a new application to be created, the new application data identifying source code of the new application and identifying an environment associated with the new application;
process the new application data, with a trained machine learning model, to generate one or more predictions associated with the new application,
wherein the trained machine learning model is trained with modified historical application creation data that includes historical support data indicating notifications that were communicated in association with one or more actions related to previously developed applications,
wherein the modified historical application creation data is generated by modifying historical application creation data based on utilizing a data cleansing technique that cross checks the historical application creation data with a validated data set,
wherein the one or more predictions include a prediction indicating whether the new application will succeed or fail, and
wherein the one or more predictions are generated based on one or more partitions partitioned from the modified historical application creation data;
update the trained machine learning model based on the one or more predictions;
provide information indicating the one or more predictions; and
perform one or more actions of:
preventing development of the new application based on the one or more predictions;
causing development of the new application based on the one or more predictions;
preventing deployment of the new application based on the one or more predictions;
causing deployment of the new application based on the one or more predictions;
preventing release of the new application based on the one or more predictions; and
causing release of the new application based on the one or more predictions.

9. The device of claim 8, wherein the one or more processors, when processing the new application data, are configured to:
provide, as input to the trained machine learning model, the new application data; and
receive, as output from the trained machine learning model, the one or more predictions.

10. The device of claim 8, wherein the new application data further identifies another one of the one or more of:
a development environment,
a testing environment, or
a production environment.

11. The device of claim 8, wherein the new application data comprises at least one of:
new development data associated with the new application,
new build data associated with the new application,
new testing data associated with the new application, or
new artifact data associated with the new application.

12. The device of claim 8, wherein the one or more processors are further configured to:
cause the new application to be at least one of developed, deployed, or released based on at least one of a release risk score, a deployment risk score, or a development risk score.

13. The device of claim 8, wherein the one or more processors are further configured to:
modify the new application to address the one or more predictions.

14. The device of claim 8, wherein the prediction further indicates whether the new application will succeed or fail during at least one of:
development of the new application,
deployment of the new application, or
release of the new application.

15. A non-transitory computer-readable medium storing instructions, the instructions comprising:
one or more instructions that, when executed by one or more processors, cause the one or more processors to:
receive new application data associated with a new application to be created, the new application data identifying source code of the new application; and identifying an environment associated with the new application;
process the new application data, with a trained machine learning model, to generate one or more predictions associated with the new application,
wherein the trained machine learning model is trained with modified historical application creation data that includes historical support data indicating notifications that were communicated in association with one or more actions related to previously developed applications,
wherein the modified historical application creation data is generated by modifying historical application creation data based on utilizing a data cleansing technique that cross checks the historical application creation data with a validated data set, and
wherein the one or more predictions include a prediction indicating whether the new application will succeed or fail, and
wherein the one or more predictions are generated based on one or more partitions partitioned from the modified historical application creation data;
update the trained machine learning model based on the one or more predictions;
provide information indicating the one or more predictions; and
perform one or more actions of:
preventing development of the new application based on the one or more predictions;
causing development of the new application based on the one or more predictions;
preventing deployment of the new application based on the one or more predictions;
causing deployment of the new application based on preventing release of the new application based on the one or more predictions; and causing release of the new application based on the one or more predictions.

16. The non-transitory computer-readable medium of claim 15, wherein the one or more instructions, that cause the one or more processors to process the new application data, cause the one or more processors to:

provide, as input to the trained machine learning model, the new application data; and receive, as output from the trained machine learning model, the one or more predictions.

17. The non-transitory computer-readable medium of claim 15, wherein the new application data further identifies another one of the one or more of:

a development environment, a testing environment, or a production environment.

18. The non-transitory computer-readable medium of claim 15, wherein the new application data comprises at least one of:

new development data associated with the new application, new build data associated with the new application, new testing data associated with the new application, or new artifact data associated with the new application.

19. The non-transitory computer-readable medium of claim 15, wherein the one or more instructions that, when executed by one or more processors, further cause the one or more processors to:

cause the new application to be at least one of developed, deployed, or released based on at least one of a release risk score, a deployment risk score, or a development risk score.

20. The non-transitory computer-readable medium of claim 15, wherein the one or more instructions that, when executed by the one or more processors, further cause the one or more processors to:

modify the new application to address the one or more predictions.

* * * * *